R. A. BECKER.
GRIPPING MEMBER FOR CONNECTORS, LINE TAPS, AND THE LIKE.
APPLICATION FILED AUG. 8, 1917.
1,323,147.
Patented Nov. 25, 1919.
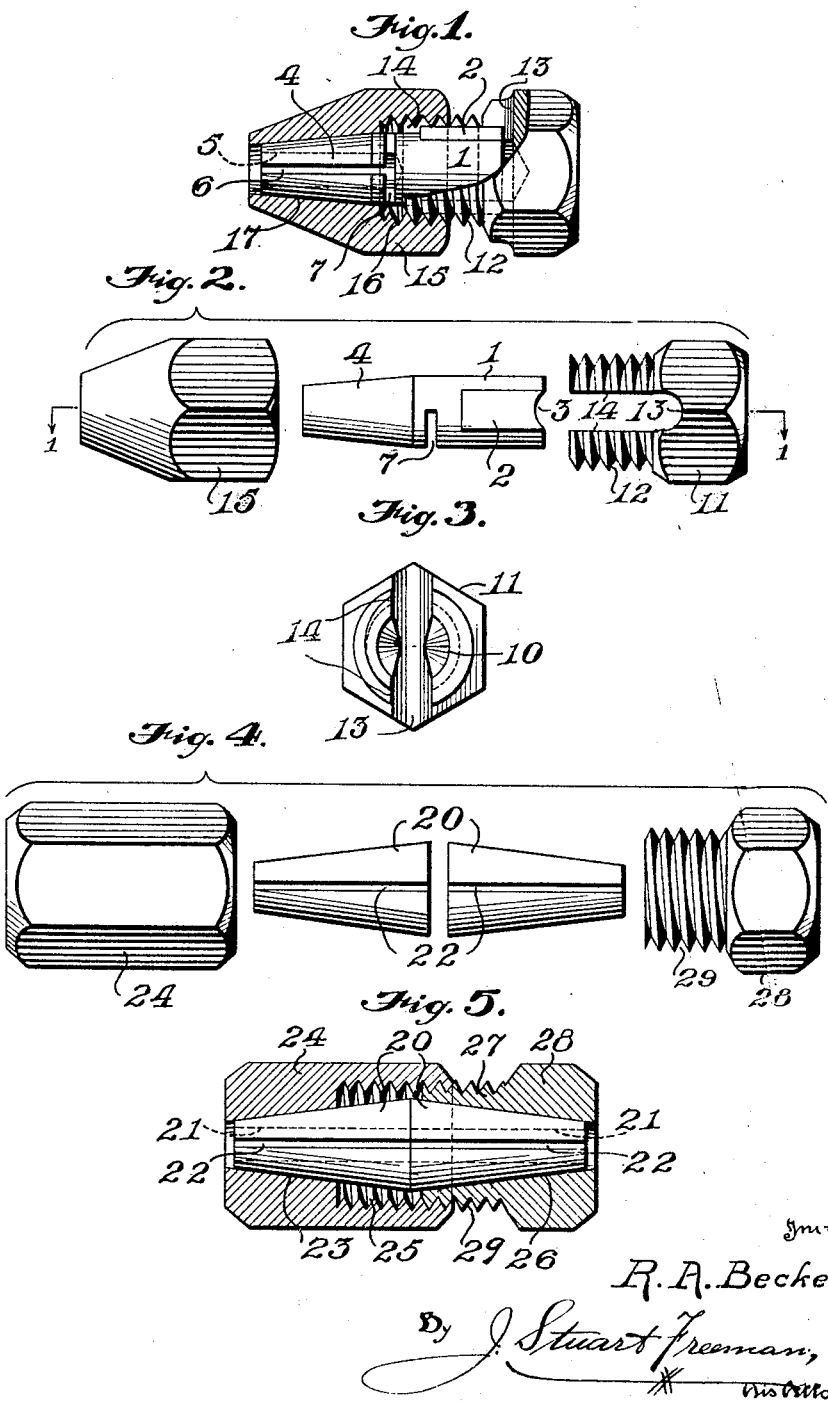

UNITED STATES PATENT OFFICE.

ROBERT A. BECKER, OF POUGHKEEPSIE, NEW YORK, ASSIGNOR OF ONE-HALF TO CHARLES TREMAIN, OF POUGHKEEPSIE, NEW YORK.

GRIPPING MEMBER FOR CONNECTORS, LINE-TAPS, AND THE LIKE.

1,323,147.   Specification of Letters Patent.   Patented Nov. 25, 1919.

Application filed August 8, 1917. Serial No. 185,007.

*To all whom it may concern:*

Be it known that I, ROBERT A. BECKER, a citizen of the United States, residing at Poughkeepsie, in the county of Dutchess and State of New York, have invented certain new and useful Improvements in Gripping Members for Connectors, Line-Taps, and the like, of which the following is a specification.
The object of the invention is to provide an improved gripping member for use in connectors, line taps, and the like.

In this art where there has been used a tapered member having longitudinal bore, through which is adapted to extend a wire cable, or the like, in conjunction with means to contract said member about said wire, etc., it has ofttimes been customary to slot such a member upon one or more of its sides, each of said slots extending from said bore outwardly through the tapered exterior surface and longitudinally from the small end of said member for any desired distance toward the large end thereof. The length of this slot or slots has thereby determined the proportionate length of that portion of said gripping member which is designed to be sufficiently flexible to yield inwardly to gripping wire or the like. And the gripping figures thus formed between the adjacent slots have a tendency to bite off the wires, or at least to grip them much more firmly at the ends of the said fingers than at the base thereof, the flexibility of said fingers being about their points of attachment to the body portion of the gripping member of which they form a part.

One of the objects of this invention is to provide, therefore, a member outwardly tapering toward one end and throughout its entire extent, the same being provided with a longitudinal bore of substantially constant diameter, and a radially extending slot cutting through one side of said member from said bore outwardly and extending from one end to the other of the extent of the former.

Another object of the invention comprises the formation of a modified type of gripping member which is believed to be a step in advance of the one just described, this latter comprising a member having a cylindrical portion adapted to protect the end of a wire inserted therein, and a tapered section separated from said first section by a transversely extending slot extending substantially through one-half of the cross section of the member as a whole, said tapered section being provided with an axial bore throughout its extent, and with a slot extending longitudinally of said tapered section from the smaller to the larger end of the latter and opening into said transverse slot and substantially midway of the length of the latter, thus forming a gripping finger which "wraps" about a wire instead of radially clenching it.

And still another object is to provide a gripping member for a connector, comprising a tapered portion having an axial bore and a slot extending from said bore radially outwardly and for the full length of said tapered portion, and a transversely extending slot intersecting said first slot at an angle, and the shank portion of said member being provided with a lug adapted to engage a portion of a surrounding member to prevent the gripping member as a whole from revolving with a second surrounding member having a tapered bore, as said last-named member is forced over the tapered portion of said gripping member and into locked engagement with said first surrounding member.

These and other objects and details in the construction and operation of the preferred embodiment of the invention are fully brought out in the following description, when read in conjunction with the accompanying drawings in which—

Figure 1 is an assembled view of a line tap embodying the improved invention and showing one of the interlocking surrounding members broken away and the other in section; Fig. 2 is an expanded view showing the respective parts of the device of Fig. 1 in elevation; Fig. 3 is a bottom plan view of the right-hand surrounding member as shown in the positions of Figs. 1 and 2; Fig. 4 is an expanded view showing the parts of the connector embodying the simpler form of the invention in elevation; and Fig. 5 is a sectional view of the connector of Fig. 4 when assembled.

Referring to the drawings, the gripping member shown in Figs. 1, 2 and 3 comprises a shank 1, which may be either hollow or solid and is provided with one or more radially extending lugs 2, integral therewith and adjacent to the larger edge portion of said member, a semi-circular groove 3 being cut transversely across the butt end of said shank portion and said lugs.

This gripping member at its other end is provided with a tapered portion 4 through which extends a longitudinal axial bore 5, while a longitudinally positioned slot 6 extends through said gripping member for a slightly greater distance than said tapered portion and bisects one side of the latter from said bore radially outwardly. The gripping member is further provided with a transversely positioned slot 7 extending transversely of the shank portion adjacent to the large end of said tapered portion and intersecting the slot 6 at an angle.

In assembling the device of which the member just described is an essential part, the latter is inserted with its larger end first into a central recessed portion 10 of an externally polygonally shaped cap member 11 externally threaded at 12, and also provided with a transversely extending groove 13 in alinement with longitudinal diametrically positioned slots 14 bisecting the said threaded portion 12. The lugs 2 of the gripping member when the latter is in the position just described pass slidably into and along the slots 14 and said gripping member is firmly held in place by an externally and polygonally shaped cap member 15, internally threaded at 16 and provided with a longitudinal outwardly tapering bore 17, adapted to closely surround the tapered portion 4 of the said gripping member and to contract the sides of said tapered portion about the end of a wire which may first be inserted in the bore 5, said gripping member in this position being adapted to firmly clamp said wire, or the like, passing transversely through the member 10 and lying in the groove 13. When the parts of this device are all in position as just described and the wires clamped thereto, as indicated, it is obvious that a highly efficient type of line tap has been provided which, when the several parts are firmly held together, will so positively grip a branch or tap wire, that it will break off beyond the limits of said member as a whole before it will be possible to pull said wire therefrom.

Referring now to Figs. 4 and 5, a connector is shown, which is considered to be an improvement over copending application Serial No. 133,633, but possibly not so efficient as that form of the invention involved in the line tap hereinbefore described. In this latter case the connector comprises two similar frusto-conical members 20, each having an axial bore 21 of constant diameter, and provided with a longitudinally extending slot 22 throughout its whole length and radially from said bore to the outer surface. One of these members is then adapted to be inserted slidably within the correspondingly tapered axially positioned portion 23 of a polygonally shaped member 24, which is internally threaded at 25, while the other of said frusto-conical members is adapted to be slidably inserted within the correspondingly tapered bore 26 extending axially through a plug 27, provided with a polygonally shaped head 28 and a reduced externally threaded portion 29, adapted to be screwed into interlocking engagement with the correspondingly threaded portion in the member 23.

In this form of device a wire is adapted to be inserted inwardly from each of the opposite ends of the connector when connected as shown in Fig. 5 and until the ends of said wires approach or abut against each other at approximately the center, after which the members 23 and 27 are rotated into interlocking engagement with each other, thus forcing the tapered members together and contracting the same about the sides of the said wires with the result that a union of said wires is created of such a positive degree that they will break off beyond the limit of the device before becoming disengaged therefrom.

Having thus described my invention, what I claim and desire to protect by Letters Patent of the United States is:

A connector, comprising the combination of interlocking members one being provided with a tapered bore, the other with a longitudinally extending slot, and a gripping member comprising a tapered portion having an axial bore and adapted to coöperate with the walls of said first bore, said tapered portion of said gripping member also being provided with a longitudinal slot extending outwardly from said bore to the surface of said tapered portion, said gripping member also being provided with a lug adapted to slide in the longitudinally extending slot of the second of said interlocking members, and with a second slot intersecting said first slot and operative to permit the opposite portions of the wall of said tapered portion to flex with substantially the same degree of freedom at the opposite ends of its longitudinal slot.

In testimony whereof I have affixed my signature.

ROBERT A. BECKER.